(12) United States Patent
Ebata

(10) Patent No.: US 11,977,839 B2
(45) Date of Patent: May 7, 2024

(54) RULE INTEGRATION DEVICE, RULE INTEGRATION METHOD, AND STORAGE MEDIUM STORING PROGRAM

(71) Applicant: NEC Corporation, Tokyo (JP)

(72) Inventor: Toshimune Ebata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 307 days.

(21) Appl. No.: 17/437,237

(22) PCT Filed: Mar. 11, 2020

(86) PCT No.: PCT/JP2020/010433
§ 371 (c)(1),
(2) Date: Sep. 8, 2021

(87) PCT Pub. No.: WO2020/184597
PCT Pub. Date: Sep. 17, 2020

(65) Prior Publication Data
US 2022/0171927 A1    Jun. 2, 2022

(30) Foreign Application Priority Data
Mar. 14, 2019    (JP) .................. 2019-047296

(51) Int. Cl.
*G06F 40/253*    (2020.01)
*G06F 16/21*    (2019.01)
*G06F 40/40*    (2020.01)

(52) U.S. Cl.
CPC .......... *G06F 40/253* (2020.01); *G06F 16/211* (2019.01); *G06F 40/40* (2020.01)

(58) Field of Classification Search
USPC ...................................... 704/1–504
See application file for complete search history.

(56) References Cited

U.S. PATENT DOCUMENTS 5,764,975 A    6/1998   Taniguchi et al.
8,135,576 B2 *  3/2012   Haley ................ G06F 40/30
                                                704/4
(Continued)

FOREIGN PATENT DOCUMENTS

JP    H08-272825 A    10/1996
JP    H09-190352 A    7/1997
(Continued)

OTHER PUBLICATIONS

International Search Report for PCT Application No. PCT/JP2020/010433, dated Jun. 16, 2020.
(Continued)

*Primary Examiner* — Marcus T Riley

(57) ABSTRACT

A rule integration device includes determination means for converting, to natural language sentences, each of multiple management rules used by a management device for managing a management target, and determining whether or not the multiple management rules are combinable based on grammar relating to the converted natural language sentences; and combination means for generating a post-combination rule by combining the multiple management rules that have been determined to be combinable by the determination means.

5 Claims, 3 Drawing Sheets

(56) References Cited

U.S. PATENT DOCUMENTS

| | | | | |
|---|---|---|---|---|
| 2008/0097748 A1* | 4/2008 | Haley | ............... | G06F 40/30 |
| | | | | 704/9 |
| 2008/0215518 A1 | 9/2008 | Matsuda | | |
| 2012/0011487 A1* | 1/2012 | Matsumoto | ......... | G06F 11/3668 |
| | | | | 717/104 |
| 2015/0206054 A1* | 7/2015 | Ando | ............... | G06N 5/025 |
| | | | | 706/47 |
| 2018/0107653 A1* | 4/2018 | Das | ............... | G06F 40/205 |
| 2022/0171927 A1* | 6/2022 | Ebata | ............... | G06F 16/211 |

FOREIGN PATENT DOCUMENTS

| | | | | |
|---|---|---|---|---|
| JP | 2002-268885 A | 9/2002 | | |
| JP | 2003-323426 A | 11/2003 | | |
| JP | 2015-191418 A | 11/2015 | | |
| JP | 2015191418 A * | 11/2015 | | |
| WO | 2006/090781 A1 | 8/2006 | | |
| WO | 2014/016998 A1 | 1/2014 | | |
| WO | WO-2014016998 A1 * | 1/2014 | ....... | G06F 17/30554 |

OTHER PUBLICATIONS

Steven Pinker, The Language Instinct, vol. 1 [Japanese edition], NHK Books, First edition, Jun. 25, 1995, pp. 144-171.
JP Office Action for JP Application No. 2021-505097, dated Sep. 6, 2022 with English Translation.

* cited by examiner

RULE INTEGRATION DEVICE, RULE INTEGRATION METHOD, AND STORAGE MEDIUM STORING PROGRAM

This application is a National Stage Entry of PCT/JP2020/010433 filed on Mar. 11, 2020, which claims priority from Japanese Patent Application 2019-047296 filed on Mar. 14, 2019, the contents of all of which are incorporated herein by reference, in their entirety.

TECHNICAL FIELD

The present invention relates to a rule integration device, a rule integration method, and a storage medium storing a program.

BACKGROUND ART

There are cases in which multiple systems handle the same data. If the management rules for that data differ for each system, then it is difficult to centralize the management of data between the systems.

With the technologies in Patent Documents 1 and 2, rules are formed by using the logical sums of conditions selected by users. Additionally, with the technology in Patent Document 3, clusters of synonymous expressions in different languages and clusters of translations thereof are formed, and representative expressions from the clusters are obtained. Additionally, with the technology in Patent Document 4, translations are made from a formal language to a natural language.

CITATION LIST

Patent Literature

[Patent Document 1]
  International Publication WO 2014/016998
[Patent Document 2]
  Japanese Unexamined Patent Application, First Publication No. 2015-191418
[Patent Document 3]
  Japanese Unexamined Patent Application, First Publication No. 2003-323426
[Patent Document 4]
  Japanese Unexamined Patent Application, First Publication No. 2002-268885

SUMMARY OF THE INVENTION

Problems to Be Solved by the Invention

Centralized data management can be facilitated by integrating management rules that are set independently in multiple systems. However, with the technologies in the above-mentioned Patent Documents 1 and 2, a user must make judgments and perform operations in order to generate rules. For this reason, if there are many rules, then there are increases in the labor cost and the time cost. Additionally, with the technologies in Patent Documents 1 and 2, even with rules having the same meaning, if different expressions are used, then they will be coupled in a logical sum, making the expression of the rule longer. Additionally, the technology in Patent Document 3 is for organizing the expressions of translations in natural language, and the organization is limited to synonymous content. Additionally, Patent Document 4 involves translation from a formal language to a natural language either by manual work by an operator (human), or automatically from a natural language document file, and management rules are not integrated.

An example of an objective of the present invention is to provide a rule integration device, a rule integration method, and a storage medium storing a program, which solve the above-mentioned problem.

Means for Solving the Problems

According to a first aspect of the invention, a rule integration device includes determination means for converting, to natural language sentences, each of multiple management rules used by a management device for managing a management target, and determining whether or not the multiple management rules are combinable based on grammar relating to the converted natural language sentences; and combination means for generating a post-combination management rule by combining the multiple management rules that have been determined to be combinable by the determination means.

According to a second aspect of the invention, a rule integration method includes a determination step of converting, to natural language sentences, each of multiple management rules used by a management device for managing a management target, and determining whether or not the multiple management rules are combinable based on grammar relating to the converted natural language sentences; and a combination step of generating a post-combination management rule by combining the multiple management rules that have been determined to be combinable in the determination step.

According to a third aspect of the invention, a program stored in a storage medium makes a computer execute processes of converting, to natural language sentences, each of multiple management rules used by a management device for managing a management target, and determining whether or not the multiple management rules are combinable based on grammar relating to the converted natural language sentences; and generating a post-combination management rule by combining the multiple management rules that have been determined to be combinable in the determination step.

Advantageous Effects of Invention

According to the present invention, management rules that are independently set by multiple systems can be integrated.

EXAMPLE EMBODIMENT

Hereinafter, an embodiment of the present invention will be explained. However, the embodiment below does not limit the invention as claimed. Additionally, the entire combination of features explained in the embodiment is not necessarily essential to the solution provided by the invention.

In the rule integration field for integrating management rules for data and the like, for example, the problems below are known. A first problem is that, when the same data is managed separately in multiple systems, it becomes difficult to manage the data centrally due to the management rules of that data differing between the systems. For example, when certain data A is being handled by multiple systems, if the management rules for data A differ for each system, then it is difficult to manage the data centrally across the systems.

A second problem is that, as the data management rules increase, the rules become more difficult to manage. A third problem is that, even if an attempt is made to combine multiple rules into one and to prepare a new rule set in order to reduce the rules, it is unclear which rules can be used.

Therefore, the rule integration device of the present embodiment uses a management rule syntax reading function, a management rule combinability determination function, and a management rule combination function to organize the management rules and present them to a user.

Specifically, the rule integration device formulates the management rules as single sentences and mechanically checks whether or not the sentences representing the management rules can be combined, thereby realizing processes for verifying whether or not there are conflicts between the management rules and combining the management rules. The mechanical check involves first converting the syntax of the management rules to natural language sentences by means of the syntax reading function. Natural language is, for example, language that is used for everyday communication. After the management rules have been converted to natural language sentences, the combinability determination function tests whether or not general natural language grammar (for example, generative grammar, etc.) can be used to create a new sentence by combining the multiple sentences. Additionally, when arranging the multiple management rules to form a single sentence by means of the combination function, formal procedure sentences are converted to natural language sentences. For this reason, the rule integration device can present each of the management rules and the post-combination management rule in natural language. Thus, the post-combination management rule is easy for a worker to read and understand.

Using FIG. 1 and FIG. 2, an example of the case in which the management target is data will be explained. Hereinafter, management rules for managing data and the like will also be referred to as data management rules.

Figure 1:
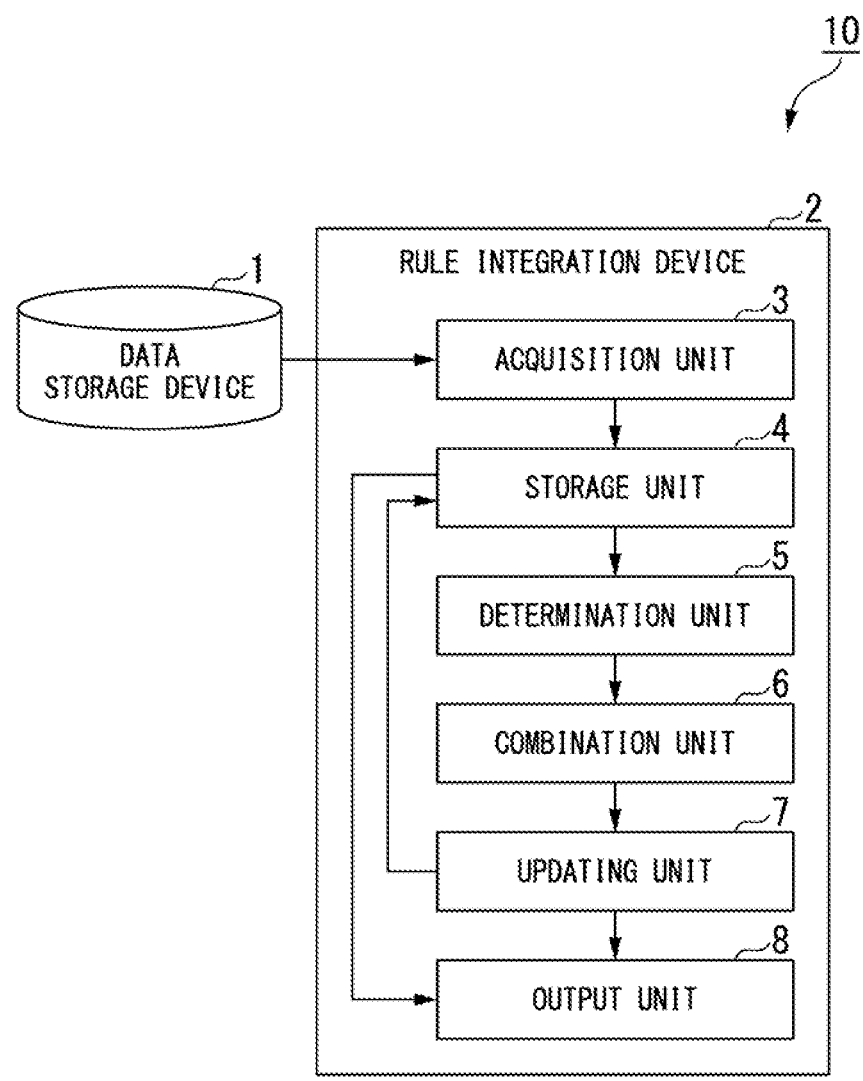
FIG. 1 is a configuration diagram of a data integration infrastructure according to an embodiment of the present invention.

FIG. 1 is a configuration diagram of a data integration infrastructure 10 according to the embodiment. The data integration infrastructure 10 has a data storage device 1 and a rule integration device 2. In this drawing, only one data storage device 1 is indicated, but there may be any number of data storage devices 1. The rule integration device 2 is used as a management device for managing data management rules. The data management rules are rules that are used for managing data stored in the data storage device 1. The data management rules represent rules for data governance.

The data storage device 1 has the function of storing data. The data storage device 1 is realized, for example, by one or more computer devices. The data storage device 1 stores the management target data itself and data management rules associated with the stored data. The data management rules may include those used in different systems.

The rule integration device 2 has an acquisition unit 3, a storage unit 4, a determination unit 5, a combination unit 6, an updating unit 7, and an output unit 8. The rule integration device 2 is realized, for example, by one or more computer devices. If the rule integration device 2 is realized by one or more computer devices connected through a network, then it may be arbitrarily chosen which of the functional units are realized by which of the computer devices. Additionally, a single computer device may be used to realize a single functional unit, or may be used to realize multiple functional units that are arbitrarily chosen. Additionally, a single functional unit may be realized by multiple computer devices.

The acquisition unit 3 has the function of acquiring data management rules that are applied to data. The storage unit 4 has the function of storing multiple data management rules. Furthermore, the storage unit 4 has the function of outputting the stored data management rules to the determination unit 5.

The determination unit 5 has the function of determining whether or not the multiple data management rules are combinable. The determination unit 5 converts each of the multiple data management rules received from the storage unit 4 to general natural language sentences. The determination unit 5 determines whether or not the multiple data management rules are combinable based on grammar (for example, generative grammar, etc.) relating to the multiple natural language sentences that have been converted.

The combination unit 6 has the function of using general natural language grammar (for example, generative grammar, etc.) to combine the multiple data management rules. The updating unit 7 has the function of adding, changing and deleting data management rules. The updating unit 7 updates multiple pre-combination data management rules with data management rules generated by being combined by the combination unit 6. The output unit 8 has the function of outputting the updated data management rules.

Due to the above-described configuration, the rule integration device 2 can realize the data management rule syntax reading function, the data management rule combinability determination function and the data management rule combination function.

Figure 2:
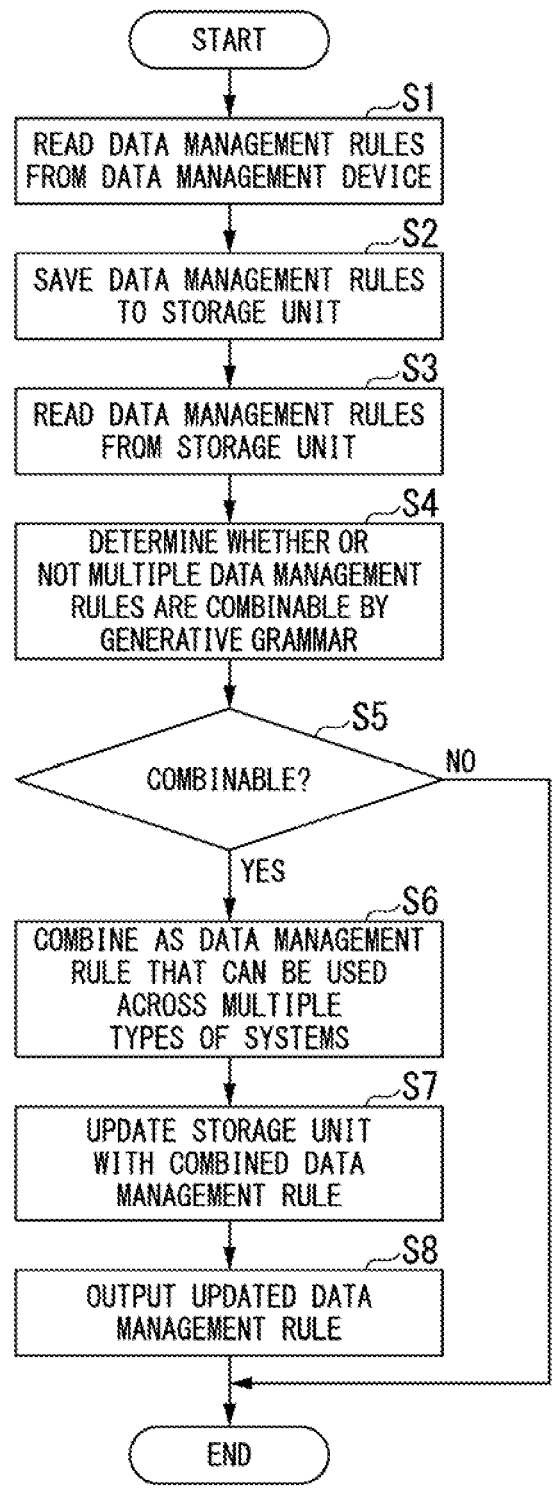
FIG. 2 is a flow chart indicating the processing in a rule integration device indicated in FIG. 1.

FIG. 2 is a flow diagram indicating the processing in the rule integration device 2. First, the acquisition unit 3 acquires data management rules for arbitrary data by reading them from the data storage device 1 (step S1). The acquisition unit 3 outputs the data management rules that have been read to the storage unit 4. The storage unit 4 saves the data management rules that have been received from the acquisition unit 3 (step S2).

The determination unit 5 reads multiple data management rules from the storage unit 4 (step S3).

The determination unit 5 assesses whether or not the multiple data management rules that have been read are combinable based on general natural language grammar (for example, generative grammar, etc.) (step S4). Generative grammar is, for example, grammar provided with means for explicitly formulating grammatical sentences in language.

Specifically, the determination unit 5 converts each of the multiple data management rules to general natural language sentences. For example, conversion rules for converting between natural language sentences and formal procedure sentences in, for example, a computer language that is used for the data management rules, are prestored in the determination unit 5 or in an external storage device that can be referenced by the determination unit 5. The determination unit 5 converts formal procedure sentences to natural language sentences in accordance with such conversion rules for each of the multiple data management rules. The determination unit 5 analyzes the grammar of the data management rules converted to natural language sentences, and determines whether or not the multiple data management rules are combinable based on the analysis results. For example, the determination unit 5 divides the natural language sentences into morphemes, determines whether they are subjects or phrases, and analyzes the dependency relationships therebetween. The determination unit 5 outputs the determination results to the combination unit 6. The process for analyzing natural language grammar may involve using linguistic analysis according to arbitrary conventional art.

For example, regarding the above-mentioned concept of generative grammar, it is possible to refer to works such as Steven Pinker, *The Language Instinct, Vol.* 1 [Japanese edition], NHK Books, 1995 and Steven Pinker, *The Language Instinct, Vol.* 2 [Japanese edition], NHK Books, 1995. Additionally, for analysis of the grammar of natural languages, it is possible to use Cabocha (Yet Another Japanese Dependency Structure Analyzer), KNP, MeCab or the like, though the invention is not limited to these examples.

The combination unit 6 assesses whether or not the determination result output from the determination unit 5 indicates combinability (step S5). Upon assessing that combinability is indicated, the combination unit 6 combines the multiple data management rules that have been determined to be combinable into a data management rule that can be used across multiple types of systems (step S6). In this case, the combination unit 6 combines multiple natural language sentences that were generated by converting the multiple data management rules that were determined to be combinable. The combination unit 6 may also convert the natural language sentence that has been generated by the combination to a data management rule in the form of a formal procedure sentence in accordance with the above-mentioned conversion rules. The combination unit 6 outputs the combined data management rule to the updating unit 7.

The updating unit 7 adds, to the storage unit 4, the data management rule in the form of a natural language sentence or a formal procedure sentence combined by the combination unit 6, and deletes, from the data storage device 1, the multiple data management rules that are the source of combination (step S7).

The output unit 8 outputs the natural language sentence of the combined data management rule (step S8). The output may be an output to a display, may be transmitted to another device that is connected by a network, may be recorded in a recording medium, or may be output to the data storage device 1. Additionally, the output unit 8 may also output data management rules that were not combined in the form of the sentences that were converted to natural language by the determination unit 5 for the determination in step S4.

Examples of the processing in the determination unit 5 and the processing in the combination unit 6 will be explained.

For example, suppose that data management rules converted to natural language sentences include rules R1 to R3 below. As mentioned above, the determination unit 5 determines whether or not the multiple data management rules (rules R1 to R3) converted to natural language sentences are combinable.

(Rule R1): Data A was transferred from DB1 to DB2 by device T1 and saved as data A.
(Rule R2): Device T1 transferred data A from DB2 to DB3 and saved the data as data A.
(Rule R3): Data B was transferred from DB4 to DB5 by device T3 and saved as data B.

The case in which generative grammar is used to combine the multiple sentences (data management rules) indicated as rules R1 to R3 into a single sentence will be explained as an example. For example, if the subjects of the multiple sentences are the same, the determination unit 5 determines that they are combinable. In this case, the subject of both rule R1 and rule R2 is "device T1". The determination unit 5 assesses that the subjects of the sentences representing rule R1 and rule R2 are the same, and determines that the sentences representing rule R1 and rule R2 are combinable. The combination unit 6 combines rule R1 and rule R2 as in the sentence representing rule Rx below. The combination unit 6, for example, generates rule Rx by combining rule R1 and rule R2 so as to have the same subject.

(Rule Rx): Device T1 transferred data A from DB1 to DB2 and saved the data as data A, and further transferred the data A from DB2 to DB3 and saved the data as data A.

The subject of rule R3 is "device T3". Since the subjects of the sentences are not the same for rule R1 and rule R3, or for rule R2 and rule R3, the determination unit 5 determines that it is not possible to combine rule R1 with rule R3 and rule R2 with rule R3, as in the example of rule Rx above.

Additionally, examples of other data management rules will be indicated. Suppose that other data management rules that were converted to natural language include rules R4 to R6 below.

(Rule R4): If user U1 does not have access privileges X, then deny access to DB2.
(Rule R5): User U1, who does not have access privileges X, is to be denied access to DB3.
(Rule R6): If user U2 has access privileges Y, then permit access to DB3.

In this case, the subject of both rule R4 and rule R5 is, for example, "user U1". Similarly, when generating a single sentence from multiple data management rules, the determination unit 5 assesses that the subjects of the sentences representing rule 4 and rule 5 are the same, and determines that the sentences representing rule R4 and rule R5 are combinable. The combination unit 6 combines rule R4 and rule R5 as in the sentence representing rule Ry below. The combination unit 6, for example, analyzes the grammar of rule R4 and rule R5, and generates rule Ry by combining rule R4 and rule R5 so as to have the same subject or to use the same phrase.

(Rule Ry): If user U1 does not have access privileges X, then deny access to DB2 and DB3.

The subject of rule R6 is "user U2". Since the subjects of the sentences are not the same for rule R5 and rule R6, or for rule R4 and rule R6, the determination unit 5 determines that it is not possible to combine rule R4 with rule R6 and rule R5 with rule R6 in the manner of the example of rule Ry above.

In the above-described embodiment, an example in which multiple sentences are assessed as being combinable if the sentences have the same subject was described. However, the invention is not limited to this example. For example, sentences may be assessed as being combinable if the objects or predicates are the same. Additionally, sentences may be assessed as being combinable if the subjects and modifiers of the subjects are the same. Additionally, sentences may be assessed as being combinable if two or more combinations of the subject, the predicate and the object, are the same. Whether or not multiple sentences can be combined depends on natural language combination rules (for example, general natural language grammar) that are independent of formal rule sets. Additionally, although generative grammar is used for the combination rules in the present embodiment, other grammatical rules may be employed if they can be checked as described above.

Figure 3:
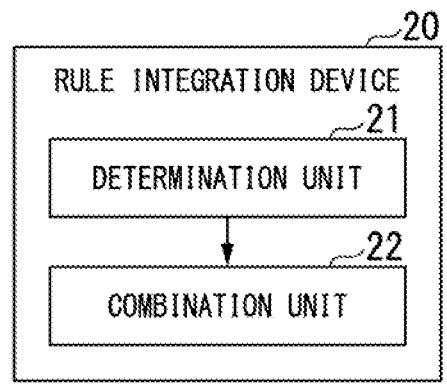
FIG. 3 is a block diagram indicating the minimum configuration of a rule integration device according to an embodiment of the present invention.

FIG. 3 is a block diagram indicating the minimum configuration of the rule integration device 20 according to an embodiment of the present invention. The rule integration device 20 with the minimum configuration indicated in said diagram is provided with a determination unit 21 and a combination unit 22. The determination unit 21 converts each of multiple data management rules used by a management device to manage a management target into a natural language sentence, and determines whether or not the multiple data management rules are combinable based on grammar relating to the converted natural language sentences. The combination unit 22 combines multiple data management rules that have been determined to be combinable by the determination unit 21, thereby generating a data management rule.

Figure 4:
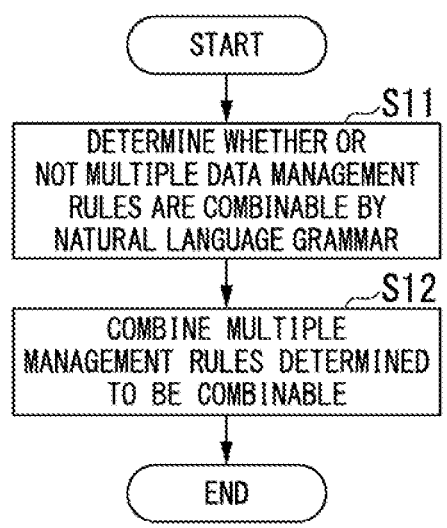
FIG. 4 is a flow chart indicating the processing in the rule integration device indicated in FIG. 3.

FIG. 4 is a flow diagram indicating the processing in the rule integration device 20 indicated in FIG. 3. First, the determination unit 21 converts each of the multiple data management rules used by the management device for managing the management target to natural language sentences. The determination unit 21 determines whether or not the multiple data management rules are combinable based on grammar relating to each of the converted natural language sentences (step S11). The combination unit 22 combines multiple data management rules that the determination unit 21 has determined to be combinable (step S12).

According to the present embodiment, data management rules that are set independently by multiple systems can be automatically integrated without manual intervention. Additionally, according to the present embodiment, the data management rules can be coupled (combined) by means of grammatical rules (generative grammar, etc.) after the data management rules have been converted to natural language sentences. For this reason, as long as there is similarity between a content of each of the data management rules, more content with the similarity can be organized. Additionally, if multiple converted data management rules have some grammar-based sentence elements in common, then the multiple data management rules can be combined. Thus, multiple data management rules can be more compactly organized. Additionally, the generative grammar that is used when organizing data management rules can be that of an arbitrary natural language.

The rule integration device 2 and the rule integration device 20 in the above-mentioned embodiments are provided with a CPU (Central Processing Unit), a memory unit, an auxiliary storage device, and the like connected by a bus. In the rule integration device 2 and the rule integration device 20, each of the functions of the rule integration device 2 and the rule integration device 20 in the above-mentioned embodiments are realized by executing a program. Some of the functions of the rule integration device 2 and the rule integration device 20 may be realized by using hardware such as an ASIC (Application-Specific Integrated Circuit), a PLD (Programmable Logic Device), or an FPGA (Field Programmable Gate Array). The program may be recorded on a computer-readable recording medium. The computer-readable recording medium is, for example, a portable medium such as a flexible disk, a magneto-optic disk, a ROM or a CD-ROM, or a storage device, such as a hard disk, that is internally mounted in a computer system. The program may be transmitted via an electrical communication line.

The present application claims the benefit of priority based on Japanese Patent Application No. 2019-047296, filed Mar. 14, 2019, the entire disclosure of which is incorporated herein by reference.

INDUSTRIAL APPLICABILITY

The present invention is applicable to devices in the rule integration field, in devices using a data management function, and the like.

REFERENCE SIGNS LIST

1 Data storage device
2, 20 Rule integration device
3 Acquisition unit
4 Storage unit
5, 21 Determination unit
6, 22 Combination unit
7 Updating unit
8 Output unit
10 Data integration infrastructure

What is claimed is:

1. A rule integration device comprising:
at least one memory configured to store instructions; and
at least one processor configured to execute the instructions to:
acquire multiple management rules used by a management device for managing a management target;
store the acquired multiple management rules into the at least one memory;
convert, to natural language sentences, each of the acquired multiple management rules, and determine whether or not the acquired multiple management rules are combinable based on grammar relating to the converted natural language sentences;
generate a post-combination management rule by combining the acquired multiple management rules that have been determined to be combinable; and
update the acquired multiple management rules as stored in the at least one memory prior to combination to the generated post-combination management rule.

2. The rule integration device according to claim 1, wherein the at least one processor is configured to execute the instructions to:
combine, into a combined natural language sentence, the converted natural language sentences generated by converting each of the acquired multiple management rules that have been determined to be combinable, and generate the post-combination management rule by converting the combined natural language sentence into a form used by the management device.

3. The rule integration device according to claim 1, wherein:
the management target includes data.

4. A rule integration method comprising:
acquiring multiple management rules used by a management device for managing a management target;
storing the acquired multiple management rules into a memory;
converting, to natural language sentences, each of the acquired multiple management rules, and determining whether or not the acquired multiple management rules are combinable based on grammar relating to the converted natural language sentences;
generating a post-combination management rule by combining the acquired multiple management rules that have been determined to be combinable in the determining; and updating the acquired multiple management rules as stored in the memory prior to combination to the generated post-combination management rule.

5. A non-transitory computer-readable storage medium storing a program that causes a computer to execute processes comprising:

acquiring multiple management rules used by a management device for managing a management target;

storing the acquired multiple management rules into a memory;

converting, to natural language sentences, each of the acquired multiple management rules, and determining whether or not the acquired multiple management rules are combinable based on grammar relating to the converted natural language sentences;

generating a post-combination management rule by combining the acquired multiple management rules that have been determined to be combinable in the determining; and updating the acquired multiple management rules as stored in the memory prior to combination to the generated post-combination management rule.

* * * * *